US006084201A

United States Patent [19]

Turner et al.

[11] Patent Number: 6,084,201

[45] Date of Patent: Jul. 4, 2000

[54] METHOD OF FORMING AN OXIDE CERAMIC ELECTRODE IN A TRANSFERRED PLASMA ARC REACTOR

[76] Inventors: Ian Turner, 10 St. Charles Boulevard, Beaconsfield Quebec, Canada, H9W 2W9; Tony Addona, 9011 Vian Boulevard, St. Leonard Quebec, Canada, H1R 2V6; Richard Munz, 4331 Montrose Avenue, Westmount Quebec, Canada, H3Y 3A8

[21] Appl. No.: 09/427,923

[22] Filed: Oct. 27, 1999

Related U.S. Application Data

[62] Division of application No. 09/130,169, Aug. 6, 1998.

[30] Foreign Application Priority Data

Aug. 6, 1997 [CA] Canada .................................. 2212471

[51] Int. Cl.$^7$ .................................................... B23K 10/00

[52] U.S. Cl. ............................... 219/121.53; 219/121.36; 219/121.52; 219/121.48; 428/329; 501/126

[58] Field of Search ......................... 219/121.36, 121.37, 219/121.52, 121.48, 121.53, 121.54, 74, 75; 428/329, 330; 313/231.31, 231.41; 501/103–106, 126

[56] References Cited

U.S. PATENT DOCUMENTS

| | | | |
|---|---|---|---|
| 5,069,771 | 12/1991 | Nguyen et al. | 264/292 |
| 5,110,774 | 5/1992 | Ogura | 501/126 |

*Primary Examiner*—Mark Paschall
*Attorney, Agent, or Firm*—Jonathan E. Grant; Grant Patent Services

[57] ABSTRACT

A method is provided for forming a molten oxide ceramic electrode for a plasma arc ignited between first and second electrodes within a plasma arc chamber, wherein the conductivity the oxide ceramic is a function of temperature alone. Following ignition of the plasma arc, a mixture is formed of a small quantity of molten oxide ceramic and a sufficiently high concentration of a volatile contaminant to render the mixture electrically conductive. The plasma arc is then transferred from one of the electrodes to the mixture. The temperature of the mixture is raised sufficiently to render the oxide ceramic electrically conductive. Finally, the volatile contaminant is progressively removed from the mixture so as to leave an electrode composed of substantially pure molten oxide ceramic.

12 Claims, 5 Drawing Sheets

METHOD OF FORMING AN OXIDE CERAMIC ELECTRODE IN A TRANSFERRED PLASMA ARC REACTOR

CROSS-REFERENCE TO RELATED APPLICATIONS

This application is a division of Ser. No. 09/130,169 filed Aug. 6, 1998, now pending based on and claims priority of Canadian Patent Application No. 2,212,471 filed Aug. 6, 1997.

MICROFICHE APPENDIX

Not Applicable.

SUMMARY OF THE INVENTION

The present invention relates to a method and apparatus for melting, vaporizing or decomposing oxide ceramic materials by means of a transferred plasma arc, and in particular to a method and apparatus for melting, vaporizing or decomposing oxide ceramics in which a plasma arc is ignited and transferred to the oxide ceramic which forms an electrode for the plasma arc during the decomposition process.

The use of a thermal plasma process for the production of an ultra-fine silica powder known as fumed silica has been investigated by various researchers over the past three decades (see Everest D. A., Sayce I. G. and Selton B. Symposium on Electrochemical Engineering, Institute of Chemical Engineers, 1973, 2: 108–121; Schnell C. R., Hamblyn S. M. L., Hengartner K., and Wissler M. Powder Technology, 1978, 20: 15–20; Bakken J. A. ISPC-1 1—Loughborough, Symposium Proceedings, IUPAC, 1993, 1: 15–16; Addona T. and Munz R. J. The Canadian Journal of Chemical Engineering, 1994, 72 (June): 476–483). The main reason for this interest is the possibility of producing fumed silica more economically than by the current industrial techniques. The current commercial method, known as flame hydrolysis, involves the burning of $SiCl_{4(g)}$ in an oxygen/hydrogen flame;

$$2H_2+O_2 \leftarrow\rightarrow 2H_2O \quad (1)$$

$$SiCl_4+2H_2O \leftarrow\rightarrow SiO_{2(s)}+4HCl \quad (2)$$

In addition to fumed silica, large amounts of HCl are also generated as a result of the use of $SiCl_4$. In contrast, the thermal plasma process reduces silica ($SiO_2$) directly to $SiO_{(g)}$, by-passing the use of $SiCl_4$ and therefore avoiding HCl production. This is followed by re-oxidation to $SiO_2$ using air or steam, $$SiO_2 \leftarrow\rightarrow SiO_{(g)}+1/2O_2 \quad (3)$$

$$SiO_{(g)}+H_2O \leftarrow\rightarrow SiO_2+H_2 \quad (4)$$

The direct decomposition of silica is a highly endothermic high temperature process needing a high energy density source such as a thermal plasma. A reducing agent such as C, Si, $NH_3$ or $H_2$ can also be used in order to increase the decomposition rate.

Even with the obvious advantages of this process, production of fumed silica using the thermal plasma route is currently of little commercial significance. The main reason for its failure has been problems with process economics and product quality. Previously published studies (see Addona T. and Munz R. J. The Canadian Journal of Chemical Engineering, 1994, 72 (June); 476–483; Addona T. and Munz R. J. 44th Canadian Chemical Engineering Conference, Book of Abstracts, Canadian Society for Chemical Engineering, 1994, 689–690) by the present inventors have shown that product quality can be improved by a proper control of the quench conditions and that improvements in process economics can be achieved by improving the thermal efficiency of the plasma reactor.

Investigations by the present inventors suggested that further improvements in process efficiency should also be possible through the use of silica as an anode material in a transferred arc system. High thermal efficiencies can be attained using a transferred arc configuration when the material being treated is an electrode. Although commonly known as a dielectric (resistivity $>10^{18}$ ohm-m at 298 K), the use of silica as an anode material was thought possible by the inventors because its electrical resistivity has been shown to decrease dramatically with temperature (Veltri R. D. Physics and Chemistry of Glasses, 1963, 4 (6): 221–228). However, in order to become sufficiently electrically conductive to permit its use as an anode, the silica must first be raised to very high temperatures. Thus while the use of silica as an anode material should, in principle, be possible, and yield commercial advantages, the high temperatures required for this type of operation effectively precluded ignition of the plasma arc where the silica forms the anode.

Furthermore, attempts to ignite the plasma arc between the cathode and a "starter" anode, and then subsequently transfer the plasma arc to the silica have proven unsatisfactory because of the tendency of the plasma arc to remain attached to the "starter" anode, even when high temperature silica is introduced into the path of the arc.

An object of the present invention is to provide a method and apparatus for establishing a silica anode of a plasma arc in a transferred arc system.

More generally, an object of the present invention is to provide a method of forming a molten ceramic oxide electrode for a plasma arc.

An aspect of the present invention provides a method of forming a molten oxide ceramic electrode of a plasma arc ignited between first and second electrodes within a plasma arc chamber, wherein the electrical conductivity of the oxide ceramic is substantially a function of temperature. A mixture is formed of a small quantity of molten oxide ceramic and a sufficiently high concentration of a volatile contaminant to render the mixture electrically conductive. The plasma arc is then transferred from one of the electrodes to the mixture. The temperature of the mixture is raised sufficiently to render the oxide ceramic electrically conductive. Finally, the volatile contaminant is progressively removed from the mixture so as to leave an electrode composed of substantially pure molten oxide ceramic.

A further aspect of the present invention provides a method of forming a molten oxide ceramic electrode for a plasma arc. The method comprises providing a plasma arc chamber having an electrode electrically coupled to a power source, and a crucible having an electrically conductive portion electrically connected to the power source. An electrically conductive electrode element is placed within the crucible and electrically connected to the electrically conductive portion of the crucible. The electrically conductive electrode element is surrounded with a volatile contaminant. The volatile contaminant is then surrounded with oxide ceramic. A plasma arc is ignited between the electrode and the electrically conductive electrode element. The volatile contaminant and a small quantity of the oxide ceramic is melted by heat generated by the plasma arc, and form a pool of an electrically conductive mixture of the volatile contaminant and oxide ceramic surrounding and in electrical contact with the electrode element, and in electrical contact with the crucible. The molten mixture of volatile contaminant and oxide ceramic is allowed to flow into the path of the arc between the electrode and the electrode element, whereby the plasma arc transfers from the electrode element to the electrically conductive molten mixture of volatile contaminant and oxide ceramic. The electrode element is then removed, and the remaining oxide ceramic is melted by continued operation of the plasma arc. The temperature of the molten mixture is then raised by continued operation of the plasma arc, the temperature of the mixture rising sufficiently to render the oxide ceramic conductive, whereby the plasma arc transfers to the oxide ceramic. The volatile contaminant is then removed from the mixture by volatilization due to continued operation of the plasma arc, whereby an electrode composed of pure molten oxide ceramic is formed.

A still further aspect of the present invention provides an apparatus for transferring a plasma arc to a molten oxide ceramic electrode in a plasma arc chamber having a first electrode and an electrically conductive crucible coupled to a power supply. The apparatus comprises an elongate electrode element capable of forming an electrical connection with the crucible, the electrode element being capable of serving as an electrode tip for ignition of the plasma arc. A volatile contaminant is disposed around the electrode element, the volatile contaminant being capable of being melted by heat generated by the electrode element following ignition of the plasma arc, and further being capable of forming an electrically conductive molten mixture with the molten oxide ceramic.

In an embodiment of the invention, the first electrode is the cathode, and the electrode element and, subsequently, the molten oxide ceramic, form the anode of the plasma arc.

The oxide ceramic can be an oxide of any metal or transition element, including oxides of silicon ($SiO_2$), tin ($Sn_xO_x$), titanium ($TiO_x$), aluminum ($Al_xO_x$), or mixtures thereof.

The volatile contaminant can be any material capable of forming an electrically conductive molten mixture with the oxide ceramic. The volatile contaminant may accomplish this result by donating electrons, ions, or holes to the molten mixture. Preferably, the vaporization temperature of the volatile contaminant is higher than the temperature at which the oxide ceramic becomes electrically conductive. By this means, both the volatile contaminant and the oxide ceramic can co-exist in an electrically conductive state, so that transfer of the plasma arc to the oxide ceramic is facilitated by the intimate contact between charge carriers of the volatile mixture and the electrically conductive oxide ceramic.

In an embodiment of the invention, the volatile contaminant has a vaporization temperature lower than that of the oxide ceramic. However, the vaporization temperature of the volatile contaminant can be equal to, or greater than that of the oxide ceramic. Preferably, the volatile contaminant is composed of a material species having comparatively high volatility in the temperature range of the molten mixture during steady-state operation. By this means, the volatile contaminant can be removed from the mixture by volatilization, thereby allowing the formation of a pure molten oxide ceramic anode, in a comparatively short period of time. Examples of materials which can be used as the volatile contaminant include (but are not necessarily limited to) sodium hydroxide (NaOH) and sodium oxide ($Na_2O$), sodium chloride (NaCl) and mixtures thereof.

Preferably, the volatile contaminant makes up 5% (by weight) or less of the total mixture at the start of the procedure, that is, at the time of ignition of the plasma arc.

In an embodiment of the present invention, the volatile contaminant is NaOH. In this case, the NaOH preferably forms approximately 2% (by weight) or less of the total mixture at the start of the procedure. Upon melting of the NaOH, a small quantity of the oxide ceramic mixes with it to form a high sodium content molten mixture. Thereafter, the components of the volatile contaminant, in this case NaOH, are removed by volatilization. This can be in the form of pure components such as Na, or compounds such as CO, $CO_2$, and $H_2O$ produced as a result of reaction between components of the molten mixture and, possibly between components of the molten mixture and the anode element. During continued operation of the plasma arc, eventually all of the components of the volatile contaminant are removed, leaving a pure oxide ceramic anode.

Removal of the electrode element can be accomplished by mechanical means, or, preferably, by volatilization, decomposition and/or consumption of the material forming the electrode element.

In an embodiment of the present invention, the conductive anode element is a graphite rod. In this case, removal of the anode element is accomplished by consumption of the material forming the anode element. Initially, this consumption of material occurs by direct vaporization due to the high heat load imposed by the plasma arc. Further progressive consumption of the graphite occurs by reaction with components of the molten mixture of volatile contaminant and oxide ceramic to form, for example, CO and $CO_2$.

The plasma is preferably formed of an inert gas, for example, argon (Ar); or a gaseous reducing agent such as, for example hydrogen ($H_2$) or ammonia; or a mixture of an inert gas and a gaseous reducing agent.

In continuous operation, fresh oxide ceramic is supplied to the crucible to replace vaporized or decomposed oxide ceramic. This supply of fresh oxide ceramic can be either continuous or semi-continuous.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
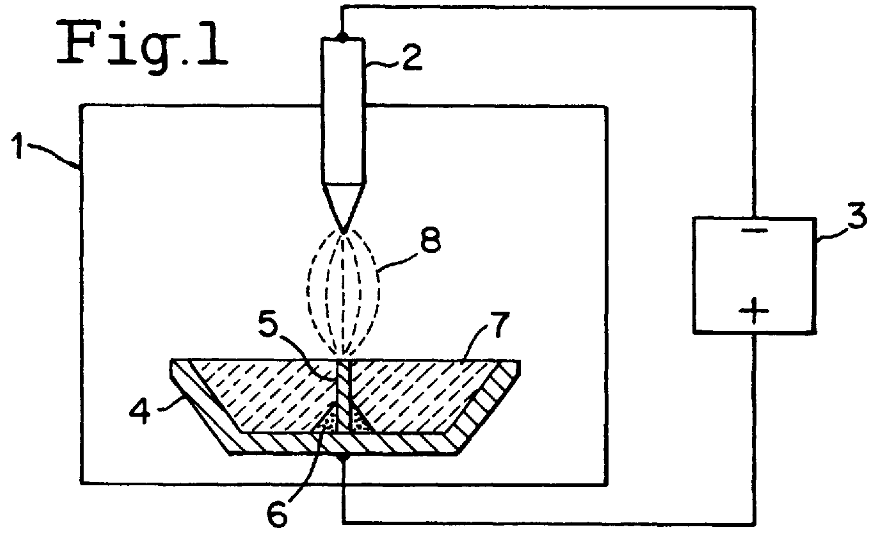
FIGS. 1–4 schematically illustrate successive stages in the formation of a molten oxide ceramic anode in accordance with an embodiment of the present invention.

Referring to FIGS. 1–4, the melting, vaporization or decomposition of oxide ceramic takes place within a plasma chamber 1 which comprises a cathode 2 electrically connected to the negative pole of a power supply 3. An electrically conductive crucible 4 is electrically connected to the positive pole of the power supply 3. A removable, electrically conductive anode element 5 is positioned within the crucible 4, at a position conducive to the striking of an arc between the anode element 5 and the cathode 2. A small quantity of volatile contaminant 6, for example NaOH, is provided around the anode element 5 and in thermal contact therewith. Finally, the remainder of the crucible 4 is filled with granular oxide ceramic 7.

The cathode 2 can be of conventional design and constructed of any suitable material typically utilized for use in plasma arcs, such as, for example, tungsten, copper or graphite. The crucible 4 is conveniently formed of graphite, providing high heat tolerance and good electrical conductivity. The crucible 4 can be designed to have generally uniform properties, whereby, for example, the entire body of the crucible 4 can be made electrically conductive. Alternatively, the crucible 4 can be designed so than only a selected portion of the crucible 4 (for example, a portion of the base of the crucible 4) is electrically conductive. Either option is workable, provided that a satisfactory electrical connection can be established between the anode element 5 and the power source 3, through the crucible 4. The anode element 5 is conveniently formed as a thin graphite rod. Both the oxide ceramic and volatile contaminant are conveniently provided as small grains of between approximately 1 mm and 5 mm diameter. The plasma chamber 1 can be filled with an atmosphere comprising an inert gas, such as argon (Ar), or a gas capable of acting as a reducing agent for the oxide ceramic, such as, for example hydrogen or ammonia, or mixtures of these gases.

Figure 2:
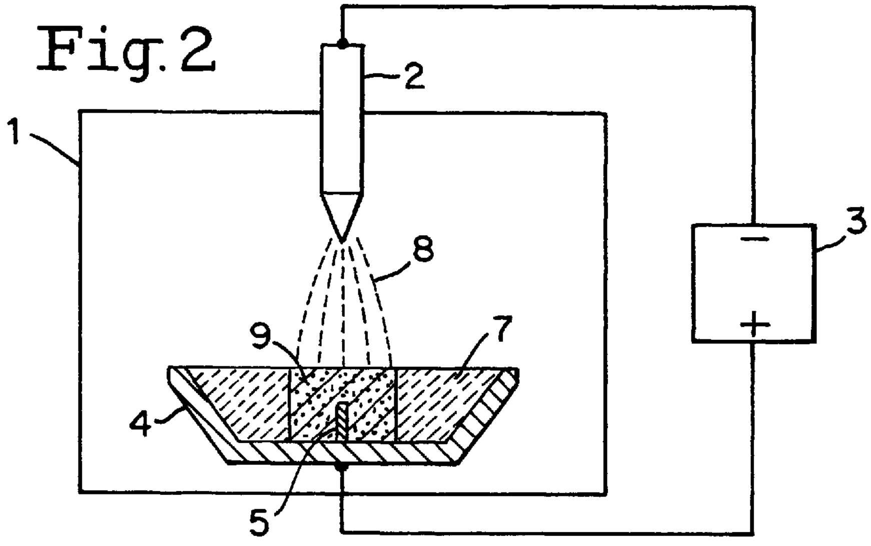

Referring in particular to FIG. 1, according to the method of the invention, a plasma arc 8 is initially ignited between the cathode 2 and the anode element 5. Once the plasma arc 8 has ignited, thermal and resistive heating of the anode element 5 melts the volatile contaminant 6 and a small quantity of oxide ceramic 7 in the immediate vicinity of the anode element 5. As shown in FIG. 2, the molten volatile contaminant and oxide ceramic combine to form a mixture 9 which has a charge carrier concentration sufficiently high that the mixture 9 is electrically conductive. Because the electrically conductive mixture 9 is in electrical contact with both the anode element 5 and the crucible 4, the plasma arc 8 can readily transfer from the anode element 5 to the mixture 9.

Transfer of the arc 8 from the anode element 5 to the mixture 9 is further facilitated by consumption of the anode element 5, which allows the mixture 9 to flow over the anode element 5, and into the path of the arc 8 between the cathode 2 and the anode element 5. Consumption of the anode element 5 is a function of the energy of the plasma arc 8. Operation of the arc at sufficiently high energy flux rates causes the temperature of the anode element 5 (particularly at the point of contact between the anode element 5 and the plasma arc 8) to increase rapidly. When the plasma arc 8 is initially struck, the heating load on the anode element 5 is high enough to vaporise graphite at the point of contact of the arc 8. With continued operation of the arc 8, the temperature of the anode element 5 and the mixture 9 become sufficiently high to allow the graphite forming the anode element 5 to react with components of the molten mixture to form volatile species such as CO and $CO_2$ gas, leading to a progressive reduction in the mass of the anode element 5. Both processes will tend to be concentrated at the upper end of the anode element 5 (i.e. nearest the point of contact between the anode element 5 and the arc 8), so that, as shown in FIGS. 1, 2 and 3, the anode element 5 will progressively shorten and eventually be entirely consumed, thereby effectively removing the anode element from the crucible 4.

Figure 3:
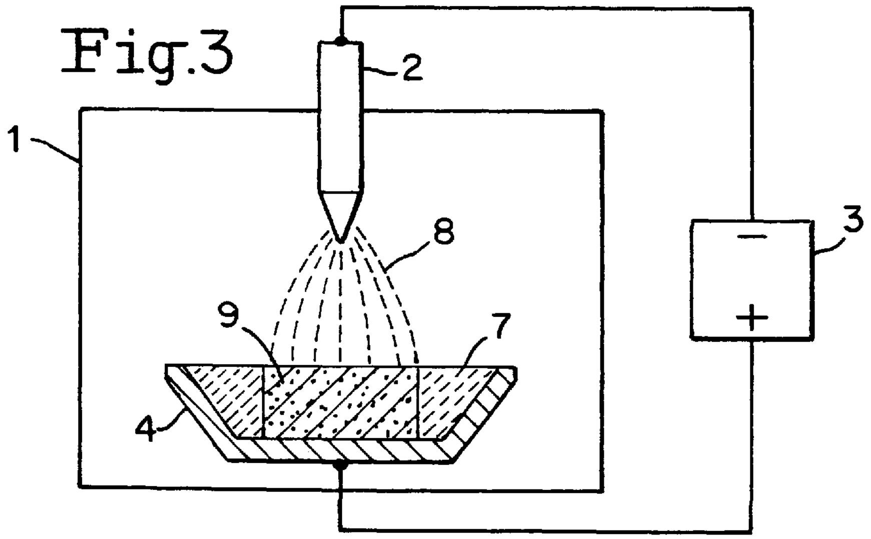

Referring to FIG. 3, continued operation of the plasma arc 8 causes progressive melting of the oxide ceramic 7, which flows into the mixture 9, thereby reducing the concentration of volatile contaminant by dilution. At the same time, the temperature of the mixture 9 progressively increases, eventually reaching a level at which the oxide ceramic becomes electrically conductive. At this point, intimate contact between charge carriers of the volatile contaminant and the oxide ceramic within the mixture 9 facilitates transfer of the arc to the oxide ceramic. The increasing temperature of the mixture 9 also causes components of the volatile contaminant to begin to evaporate from the mixture, thereby further progressively reducing the concentration of volatile contaminant in the mixture 9.

Figure 4:
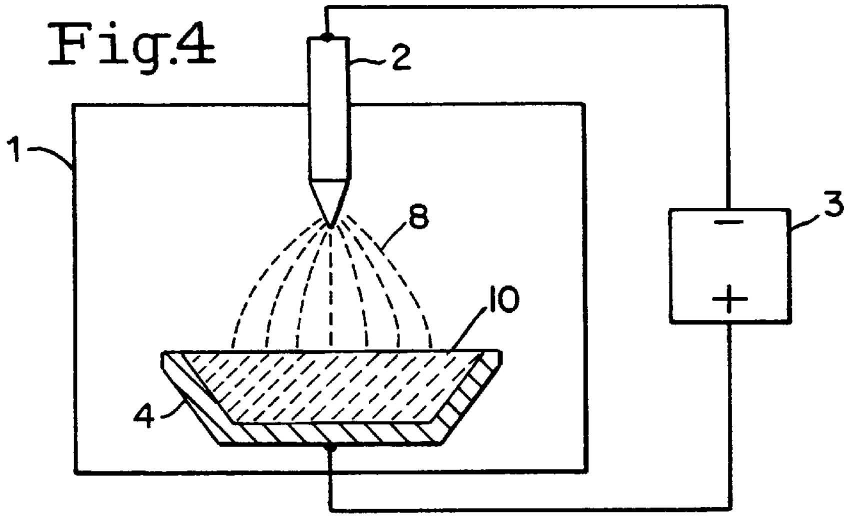
Figure 5:
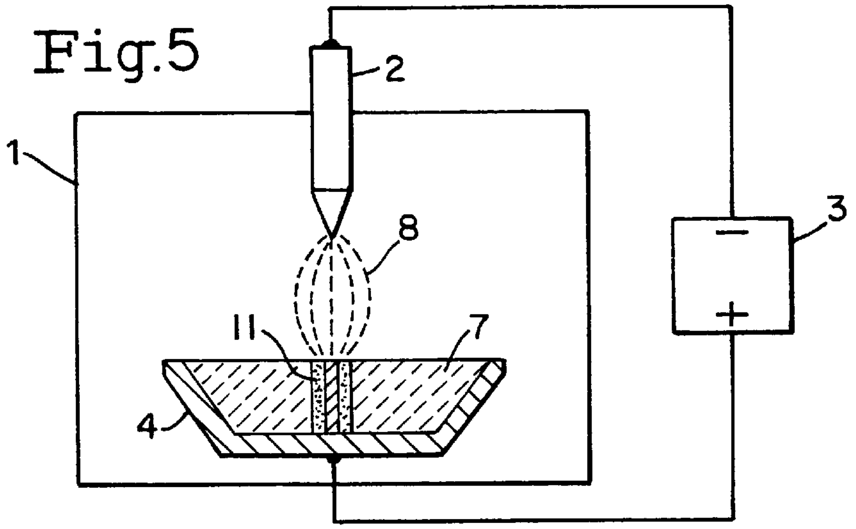
FIG. 5 schematically illustrates an alternative embodiment of the present invention.

Referring now to FIG. 4, continued operation of the plasma arc 8 allows the entire system to reach a steady state. In this condition, all of the volatile contaminant has evaporated from the mixture 9, leaving a molten anode 10 composed of substantially pure oxide ceramic. In this condition, the oxide ceramic is electrically conductive, and therefore capable of acting as an anode, solely due to its temperature. A drop in temperature will result in a reduction of the conductivity of the oxide ceramic, and a corresponding reduction in its ability to act as an anode. An excessive temperature drop would allow the oxide ceramic to revert to an electrically non-conductive condition, and shut down the plasma arc 8.

Figure 8:
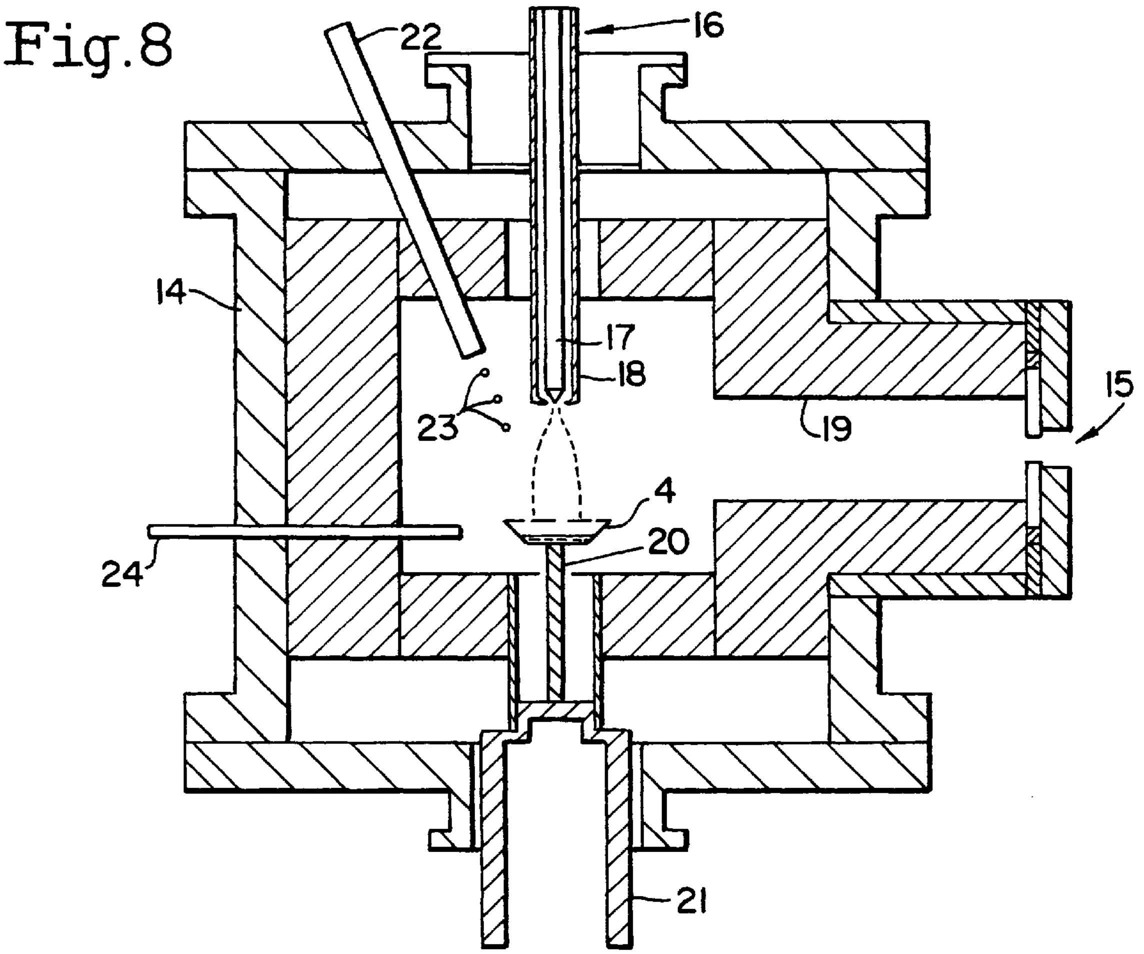
FIG. 8 schematically illustrates a plasma reactor usable with the method of the present invention.

Continuous steady state operation of the system can be accomplished by feeding fresh oxide ceramic to the crucible in order to maintain an approximately constant amount of molten oxide ceramic in the crucible 4. The supply of fresh oxide ceramic can be continuous or semi-continuous, and can conveniently be in the form of small grains of solid oxide ceramic 23 (see FIG. 8) which can conveniently be supplied to the crucible 4 via a feed tube 22 (FIG. 8). The energy required to melt and integrate these small grains of oxide ceramic into the molten anode 10 can be readily supplied by the plasma arc 8, and thus does not cause a significant drop in the temperature of the molten anode 10.

The ratio of volatile contaminant 6 to oxide ceramic 7 is not critical to operation of the method of the invention, because the volatile contaminant 6 is disposed in the immediate vicinity of the anode element 5 when the plasma arc is ignited. As a result, the volatile contaminant 6 melts very quickly after ignition of the arc 8, and mixes with a small quantity of melted oxide ceramic 7. Thus in the initial stages of operation, in accordance with the invention, the mixture 9 will have a very high proportion of volatile contaminant (on the order of 50%), in spite of the fact that the overall proportion of volatile contaminant is very much lower. For example, in one experimental run (described in greater detail below), 4 g of NaOH was used in a crucible containing 140 g of crushed quartz (99.94% $SiO_2$). Thus the total mixture was composed of approximately 97% oxide ceramic ($SiO_2$) and 3% volatile contaminant (NaOH). However, because the quartz melts progressively during the process of the invention, the concentration of the volatile contaminant in the molten mixture immediately after ignition of the arc 8 will have been significantly higher than 3%.

This illustrates one of the defining characteristics of the present invention. In particular, the method of the invention ensures that the arc will transfer to the oxide ceramic by providing an intermediate stage, in which the arc transfers to a mixture of oxide ceramic and contaminant, which is electrically conductive even at comparatively low temperatures. Subsequent transfer of the arc to a pure oxide ceramic anode is accomplished progressively as the temperature of the mixture rises, and the concentration of contaminant diminishes. The method of the invention avoids the normally encountered problems associated with transferring the arc from a starter anode to the oxide ceramic by replacing the conventional single step transfer with a gradual, progressive process.

FIGS. 5 and 6*a–f*, schematically illustrate an alternative embodiment of the present invention. In this case, the anode element 5 and volatile contaminant 6 are formed together as a single starter pencil 11. As shown in FIGS. 6*a–f*, the starter pencil 11 is composed of a core member 12 forming an electrically conductive anode element surrounded by an outer jacket 13 of volatile contaminant material. As described above, the core member 12 can, for example, be composed of graphite, and the outer jacket 13 can conveniently be composed of any of sodium hydroxide (NaOH) and sodium oxide ($Na_2O$), sodium chloride (NaCl), and mixtures thereof.

Figure 6A:
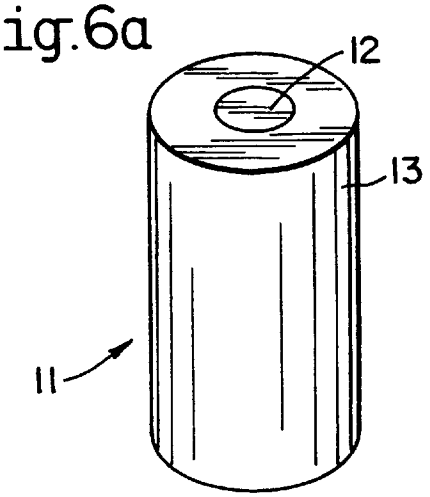
FIGS. 6*a*–6*f* illustrate various embodiments of a starter pencil useable in the embodiment of FIG. 5.
Figure 6B:
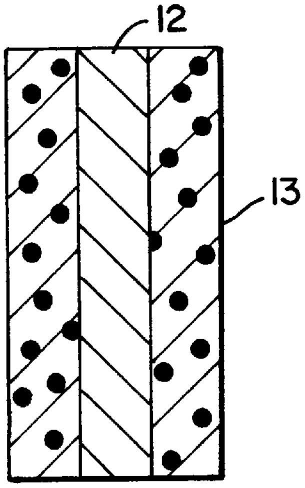
Figure 6C:
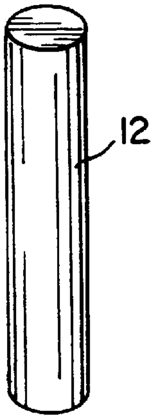
Figure 6D:
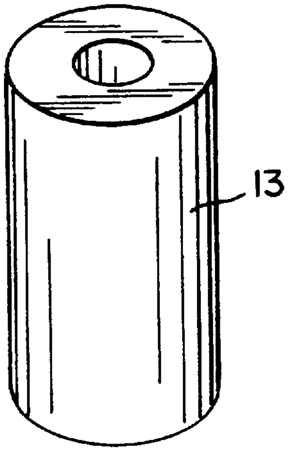
Figure 6E:
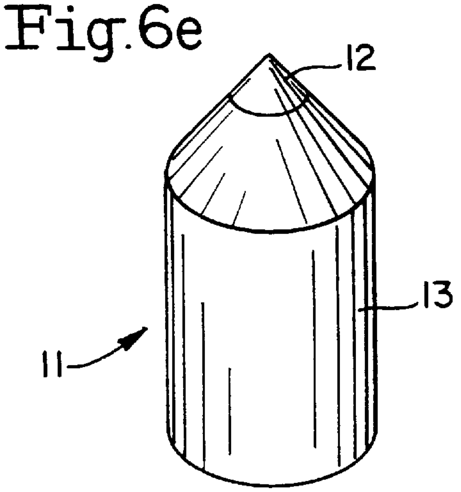
Figure 6F:
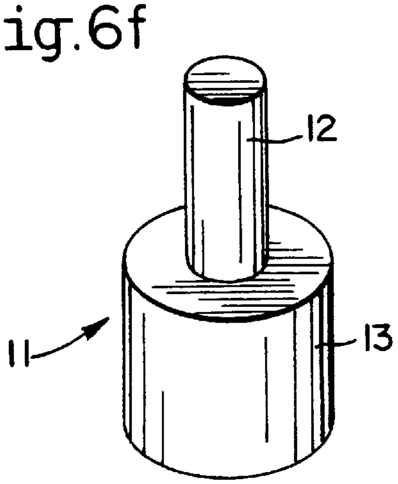

As shown in FIGS. 6*a–b*, the core member 12 and outer jacket 13 can be fabricated as a single unit. Alternatively, the core member 12 and outer jacket 13 can fabricated separately (see FIGS. 6*c–d*) and assembled on site prior to use. In these latter embodiments, core members 12 and outer jackets 13 having respective different dimensions (such as, for example, different core diameters and lengths, and different outer jacket thicknesses) can be manufactured. By this means, a user can select a desired combination of a core member 12 and an outer jacket 13, (taking into account such parameters as the dimensions of the crucible, amount of oxide ceramic in the crucible during start-up, and the power of the plasma arc) in order to provide reliable and efficient ignition and transfer of the plasma arc to the oxide ceramic.

If desired, the starter pencil can be formed with a tapered of conical top end (FIG. 6*e*) of can be stepped (FIG. 6*f*) to facilitate initial ignition of the plasma arc and formation of the conductive mixture 9.

Figure 7:
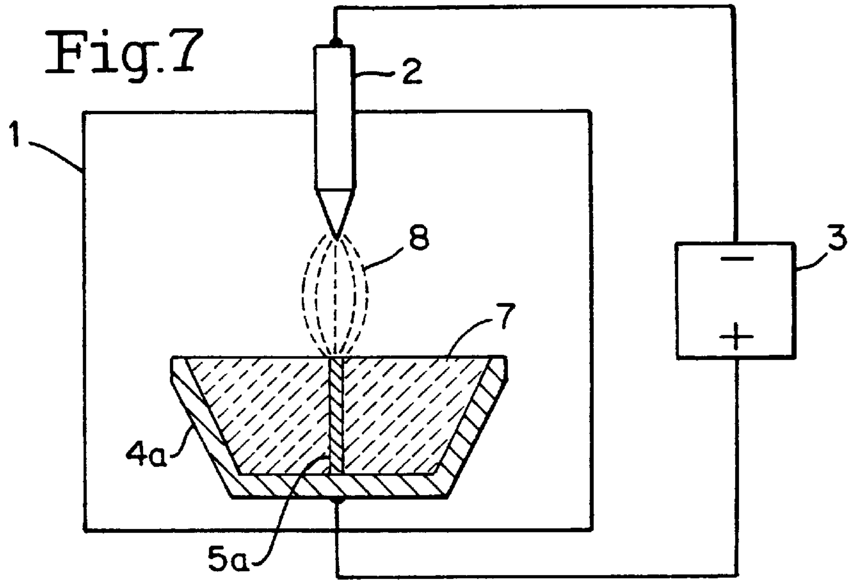
FIG. 7 illustrates a further embodiment of the present invention.

FIG. 7 schematically illustrates a further alternative embodiment of the present invention. In this case, the crucible 4 of FIG. 1 is replaced by a deep crucible 4*a*, and the anode element 5 of FIG. 1 replaced by a long anode element 5*a*. In this embodiment, the volatile contaminant 6 of the embodiment of FIGS. 1–6 is omitted entirely, so that transfer of the arc 8 from the anode element 5*a* occurs directly to the molten oxide ceramic 7, rather than to a contaminated mixture 9. Direct transfer of the arc can only occur if the temperature of the oxide ceramic in the vicinity of the anode element is raised high enough to render the oxide ceramic electrically conductive.

Once the arc 8 is struck between the cathode 2 and the anode element 5*a*, oxide ceramic 7 in the immediate vicinity of the anode element 5*a* melts rapidly. Continued operation of the arc 8 causes progressive consumption of the anode element 5*a* in the manner described above, allowing molten oxide ceramic 7 to flow over the anode element 5*a* and into the path of the arc 8. By making the anode element 5*a* sufficiently long, the arc can be sustained between the cathode 2 and the (progressively shortening) anode element 5*a* for a long enough period of time to allow the temperature of the molten oxide ceramic laying in the path of the arc to reach an electrically conductive temperature. At this point, the arc 8 can transfer to the oxide ceramic, and any remaining portion of the anode element 5*a* consumed, to leave a pure ceramic oxide anode.

This embodiment provides an alternative method of achieving a pure oxide ceramic anode, which may allow the system to reach a steady state condition more rapidly, because delays due to the time required for the volatile contaminant to evaporate from the mixture are eliminated. However, against this saving is the fact that the anode element 5*a* is longer, and thus the period of time required to consume the anode element 5*a* will be correspondingly longer. In addition, a higher plasma arc energy (thus requiring a larger power supply) may also be required in order to ensure that the arc 8 continues to operate in spite of having a significant amount of non-conductive oxide ceramic 7 in the path of the arc 8, and further to ensure that the oxide ceramic 7 reaches a sufficiently high temperature to become conductive.

Experimental Study

The following is a detailed description of an experimental study of the vaporization and decomposition of a oxide ceramic in accordance with an embodiment of the present invention. In the experimental study, the oxide ceramic selected was silica (Silicon dioxide—$SiO_2$). The raw material supplied into the plasma chamber was silica in the form of mined quartz selected for high silica purity (99.94% $SiO_2$). Reasons for this selection of material include: the low cost and ready availability of the raw material; the decomposition of silica yields a known product which has an existing market; silica is representative of many oxide ceramics in terms of its physical and electrical properties; and the use of high purity mined quartz is representative of the raw materials which would likely be used in an industrial-scale application of the process of the invention. Thus it will be appreciated that the following experimental study is illustrative of the present invention, but that the present invention is not limited to the decomposition of silica.

Silica decomposition is the first step in the thermal plasma production of fumed silica. The main goal of this experimental study was to investigate a transferred arc configuration in which the silica itself served as the anode. The effects of important plasma chamber operating parameters on the decomposition rate were investigated. These included the torch gas flow rate (10–20 lpm, Ar) and arc current (150–250 A). Experiments consisted of steady-state operation at a given torch gas flow rate and current for 1–3 hours with the silica decomposition rate determined by mass difference. Voltage and the temperature of the graphite crucible, which contained the silica, were also recorded. The decomposition rate was found to increase significantly with arc current and be essentially independent of torch gas flow rate. Decomposition rates ranging from approximately 0.1–0.8 g/min. were obtained.

A schematic diagram of the plasma reactor used in this study is shown in FIG. 8. The reactor consisted of a cylindrical, stainless steel vessel 14 with a side exit 15 and view port (not shown). The plasma arc torch 16 used was similar to that used by Choi and Gauvin, and Parisi (See Choi H. K. and Gauvin W. H., Plasma Chemistry and Plasma Processing, 1982, 2 (4): 361–386, and Parisi P. J., M. Eng. Thesis, Department of Chemical Engineering, McGill University, Montreal, Canada, 1984). This torch 16 consisted of a conical thoriated-tungsten tip cathode 17 and a copper nozzle 18 having an outlet diameter of 0.635 cm. The nozzle 18 also served as an auxiliary anode during arc ignition. The crucible 4 and inner chamber 19 were both constructed from graphite. The crucible 4 was conical in shape with a maximum diameter of 10.2 cm and allowed a bath height of 2.54 cm. A long (16.2 cm) graphite cylinder 20 (O. D.=1.27 cm, I. D.=0.95 cm) served as the electrical contact between the crucible 4 and the anode holder 21. The distance from the tip of the cathode 17 to the top edge of the crucible 4 was approximately 2 cm. Power to the torch 16 was supplied by a stack of 8 dc rectifiers (not shown) connected in series. A vibrating bowl feeder 22 was used to feed quartz particles 23 (1–3 mm diameter) into the crucible 4. Argon from high pressure cylinders (not shown) and regulated by calibrated rotameters (not shown) was fed to the plasma torch 16 (10–20 lpm, 293 K and 101.3 kPa), particle feeder 22 (4.1 lpm) and view port (3.6 lpm).

The experimental procedure consisted of determining the net mass of silica decomposed for a given torch gas flow rate and arc current. The arc was ignited using a high frequency generator. The arc was initially struck to a graphite rod placed in the middle of the crucible and surrounded by quartz particles, and a small quantity of NaOH volatile contaminant (as shown in FIG. 1). Once melted, the silica flowed over the rod and the arc transferred to the molten surface in the manner illustrated in FIGS. 1–4. Particle feeding was begun shortly after complete melting of the quartz to maintain the silica bath at an approximately constant height throughout the experiment. Three levels of each parameter were investigated and a minimum of one replicate was performed at each condition. The arc currents and torch gas flow rates looked at were 150, 200 and 250 A, and 10, 15 and 20 lpm respectively. Pressure within the plasma chamber was maintained at 101.3–111.7 kPa using a vacuum pump (not shown) located down-stream of the side exit 15. Voltage across the cathode and anode was measured using a divider and a multimeter (not shown). A shunt (not shown) connected in series with the anode 21 was used to measure current. The shunt and divider outputs were connected to a data acquisition system (not shown). A correction to the voltage reading was required to account for the resistance of the graphite cylinder 20 connecting the crucible 4 to the anode holder 21. All other electrical connections (cathode, crucible, anode holder, shunt and cables) were found to be of negligible resistance. The temperature of the bottom of the crucible was measured using a type C thermocouple 24.

Experiments had a duration of 1, 2 and 3 hours for current levels of 250, 200 and 150 Amps respectively. Transfer of the arc to a silica anode occurred within a few minutes after start-up. Once transferred, the arc impinged onto a molten silica bath and stable operation was attained. Occasional bubbling within the bath was observed at the upper current level probably due to CO formation at the silica/crucible interface. Steady-state was assumed to have begun once the crucible temperature had attained 90% of its final value. The time required to attain steady-state varied from 15 (250 A)–30 (150 A) minutes. The experimental results are summarised in FIGS. 9–11.

Figure 9:
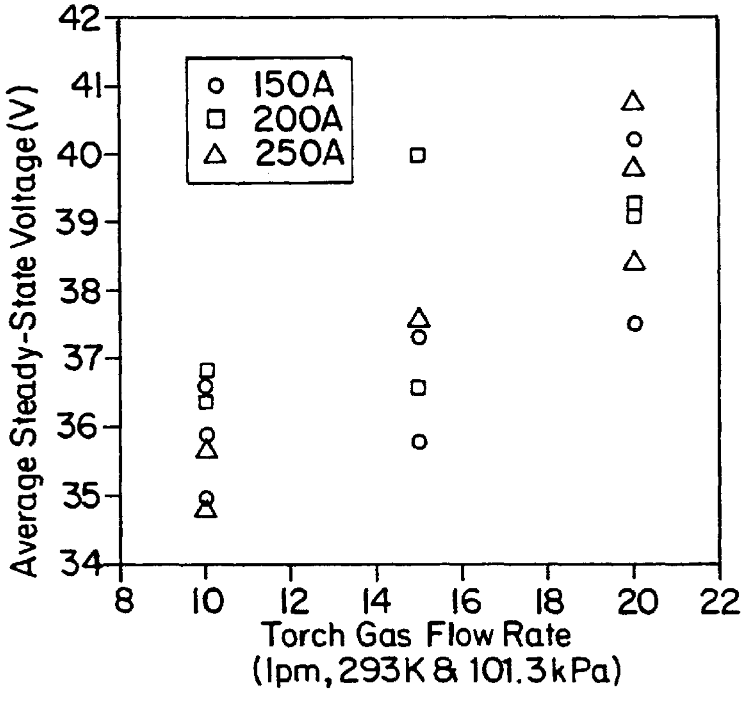
FIGS. 9–11 are charts showing steady state parameters obtained during experimental operation of a transferred plasma arc system started using the method of the present invention.
Figure 10:
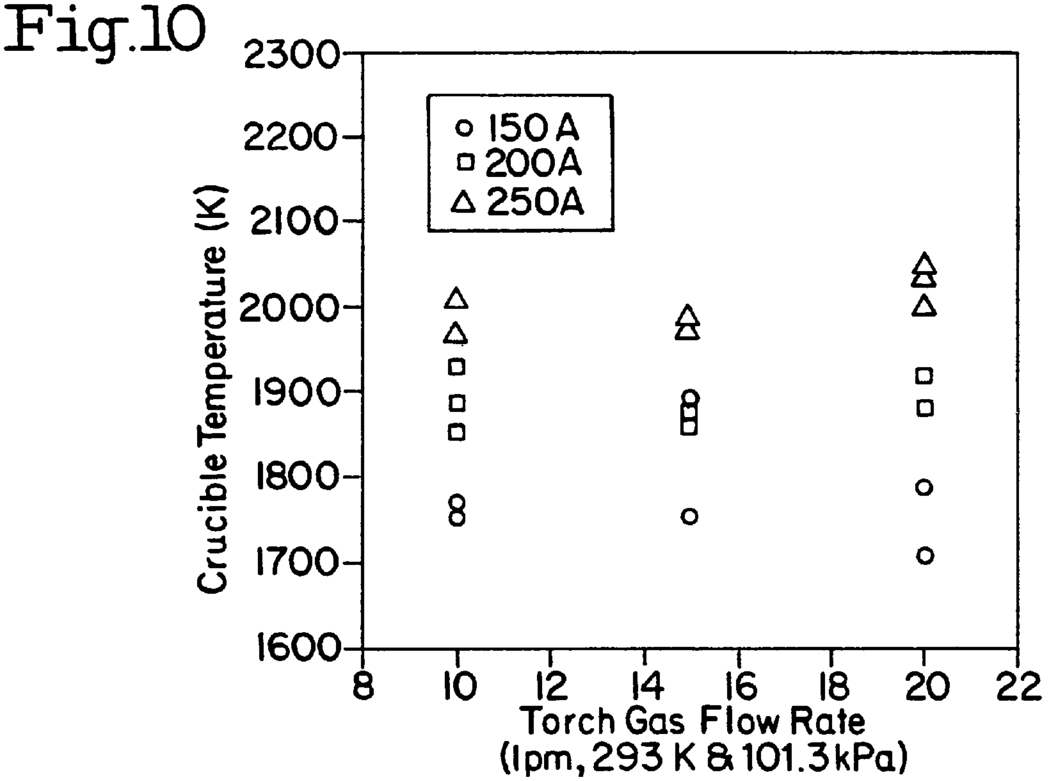

FIG. 9 shows the corrected voltage (i.e. that due to the arc and the silica bath only) plotted as a function of torch gas flow rate for the three current levels studied. From the graph we see that the voltage increased with torch gas flow rate and was essentially independent of current. A linear regression analysis verified the effect of torch gas flow rate and showed the voltage to decrease slightly with current, however, this may have been due to the scatter of the data. The weak dependence of voltage on current is probably the result of the small increase in arc voltage with increasing current being compensated by an equally small reduction in the anode voltage. The decrease in anode voltage with current can be explained by a lowering of the silica electrical resistivity due to an increase in temperature (see FIG. 10). In the above discussion we have neglected the effect of increasing arc contamination by Si and O species by increasing current (see FIG. 11) which may also have an effect on the arc voltage. Increasing the torch gas flow rate at constant current did not result in a significant variation of the crucible temperature and silica decomposition rate. We can therefore attribute the increase in voltage with torch gas flow rate to an increase in the arc voltage due to a cooling of the arc attachment at the cathode tip. This effect has been well documented for atmospheric pressure Ar arcs struck to both hot and cold metal anodes.

Figure 11:
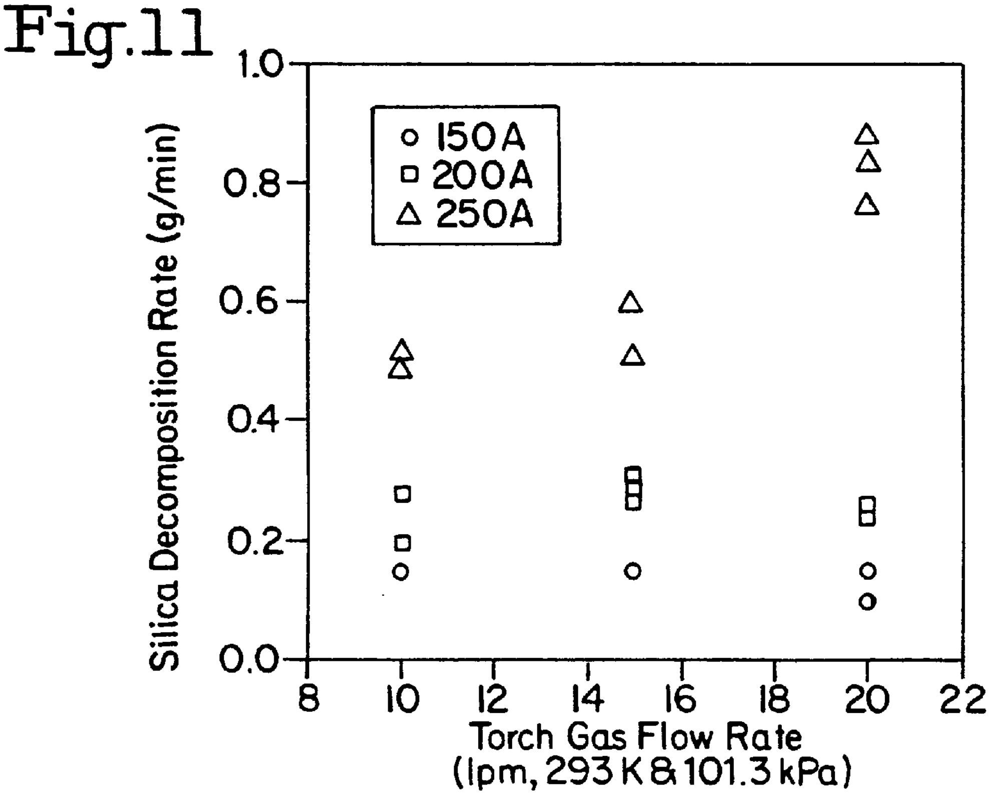

The average silica decomposition rate is plotted in FIG. 11. Since the average was taken over an entire experiment the actual steady-state values are slightly higher than those presented here. In general, the rate of silica decomposition was found to increase with current and be unaffected by the torch gas flow rate. The only deviation from this trend was observed when the maximum torch gas flow rate and current were used (20 lpm/250 A). This deviation was probably due to an increase in the reduction of silica at the graphite crucible surface. A region where this reduction was often observed was the top edge of the crucible facing the exit tube. Since this edge was located furthest from the feeding point it was slightly exposed due to the lower silica level. The exposed graphite surface was therefore more susceptible to heating by radiation from the arc. The increase in the silica decomposition rate with current is the result of a higher heat flux to the anode surface due to an increase in convective, radiation and electronic heat transfer rates. The increased current flow also results in higher temperatures within the silica bath due to an increase in resistance heating. The insensitivity of the decomposition rate to torch gas flow rate is evidence that the decomposition is a heat transfer rather than a mass transfer limited process.

This study demonstrates that the use of silica as an anode in a transferred arc system, in accordance with the present invention, is possible. The method of the invention clearly presents a practical and reliable means for igniting a plasma arc and subsequently transferring the arc to an oxide ceramic anode.

It will be apparent to those skilled in the art that various modifications can be made to the above-described embodiments, without departing from the scope of the invention. For example, in the specific embodiments described above, the crucible is connected to the positive pole of a power supply, so that the molten oxide ceramic forms the anode of the transferred plasma arc. However, it will be seen that the polarity of the electrodes may be reversed, so that the molten oxide ceramic forms the cathode of the transferred plasma arc. In this case, the use of reducing agents in the plasma gas would be undesirable, as the reducing reaction would tend to take place on the plasma torch rather than the molten oxide ceramic. However, this problem can readily be overcome by utilising a gaseous oxidizing agent, such as, for example oxygen (O2), in the plasma gas.

Thus it will be understood that the embodiments described above are intended to be illustrative, rather than limitative of the present invention.

What is claimed is:

1. An apparatus for transferring a plasma arc to a molten oxide ceramic electrode in a plasma arc chamber having a first electrode and an at least partially electrically conductive crucible coupled to a power supply, the apparatus comprising:

(a) an elongate electrode element capable of forming an electrical connection with the crucible, the electrode element being capable of serving as an electrode tip for ignition of the plasma arc; and (b) a volatile contaminant disposed around the electrode element, the volatile contaminant being capable of being melted by heat generated by the electrode element following ignition of the plasma arc, and further being capable of forming an electrically conductive molten mixture with the molten oxide ceramic.

2. The apparatus of claim 1, wherein the crucible is substantially uniformly electrically conductive.

3. The apparatus of claim 1, wherein the crucible comprises an electrically conductive portion.

4. The apparatus of claim 3, wherein the electrically conductive portion is disposed in a base of the crucible.

5. The apparatus of claim 1, wherein the volatile contaminant is a material having a vaporization temperature lower than that of the oxide ceramic.

6. The apparatus of claim 5, wherein the vaporization temperature of the volatile contaminant is higher than the temperature at which the oxide ceramic becomes electrically conductive.

7. The apparatus of claim 6, wherein the volatile contaminant is composed of a material species having comparatively high volatility in the temperature range of the molten mixture during steady-state operation.

8. The apparatus of claim 5, wherein the volatile contaminant is composed of one or more of sodium hydroxide (NaOH), sodium chloride (NaCl), and sodium oxide ($Na_2O$), and mixtures thereof.

9. The apparatus of claim 1, wherein both the electrode element and the volatile contaminant are at least partially destroyed following ignition of the plasma arc.

10. The apparatus of claim 9, wherein the electrode element is at least partially destroyed by vaporization at the point of contact between the electrode element and the plasma arc.

11. The apparatus of claim 10, wherein the electrode element is at least partially destroyed by reaction with components of the molten mixture of the oxide ceramic and the volatile contaminant.

12. The apparatus of claim 9, wherein the volatile contaminant is at least partially destroyed by volatilization.

* * * * *